United States Patent [19]

Schmerling et al.

[11] 4,190,636
[45] Feb. 26, 1980

[54] PRODUCTION OF CARBON MONOXIDE IN A PLASMA ARC REACTOR

[75] Inventors: Donald W. Schmerling, York; Frederick Giacobbe, Hanover, both of Pa.

[73] Assignee: Chemetron Corporation, Chicago, Ill.

[21] Appl. No.: 945,991

[22] Filed: Sep. 26, 1978

[51] Int. Cl.² .............................................. C01B 31/18
[52] U.S. Cl. ........................ 423/415 A; 423/DIG. 10
[58] Field of Search .................. 423/415 A, DIG. 10; 204/164, 173

[56] References Cited

U.S. PATENT DOCUMENTS

| 3,954,954 | 5/1976 | Davis et al. | 204/164 |
| 4,040,976 | 8/1977 | Greene | 423/415 A |

OTHER PUBLICATIONS

McDonald et al., "Plasma Reaction with Powdered Coal" Fuels Engineering Department, University of Utah, Salt Lake City, Utah, 1966, 93 pp.

Primary Examiner—Earl C. Thomas
Attorney, Agent, or Firm—Vincent G. Gioia; William J. O'Rourke, Jr.

[57] ABSTRACT

An improved method of producing carbon monoxide in a plasma arc reactor is disclosed, wherein carbon dioxide is delivered to an arc to form a plasma into which solid carbon is delivered. The products are quenched and filtered to yield carbon monoxide. High yields of carbon monoxide of high purity and high efficiencies of electrical-to-chemical conversion thus may be achieved.

5 Claims, 4 Drawing Figures

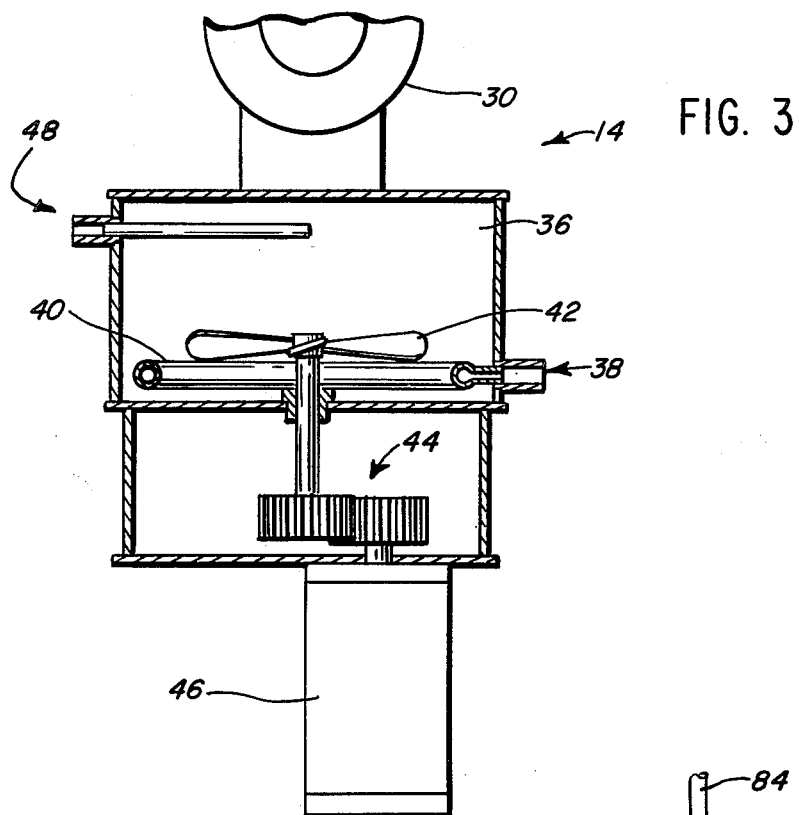
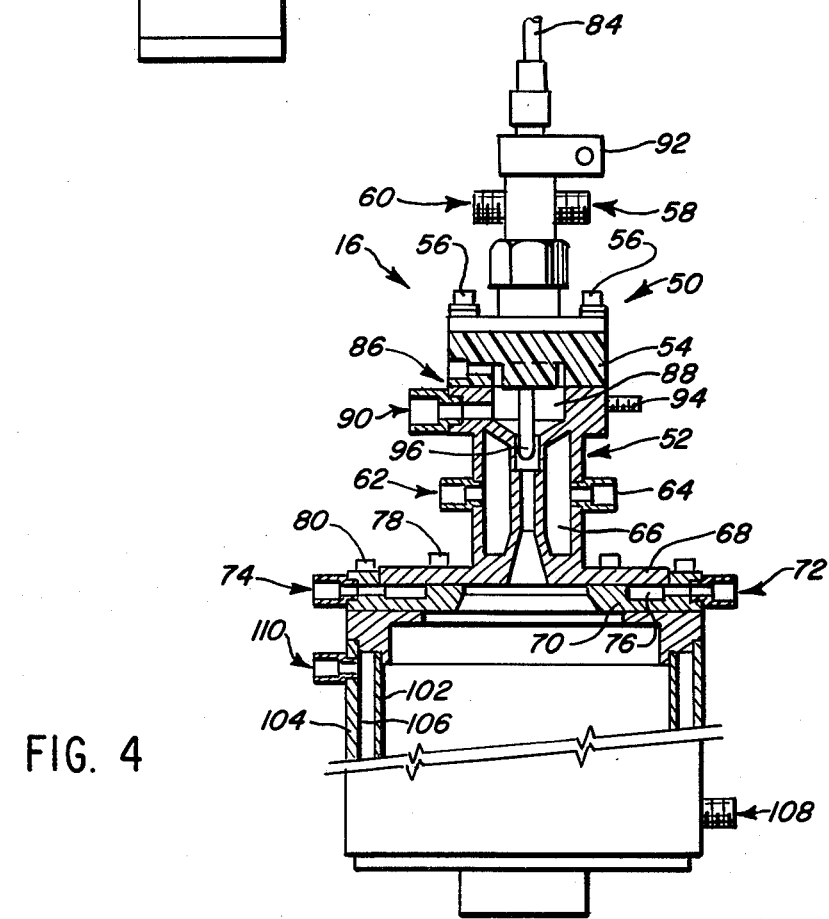

PRODUCTION OF CARBON MONOXIDE IN A PLASMA ARC REACTOR

BACKGROUND OF THE INVENTION

This invention pertains generally to the production of carbon monoxide and more particularly to its production directly from carbon dioxide and solid carbon at high temperatures, by the following reaction:

$$C(s) + CO_2(g) = 2CO(g)$$

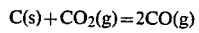

An important commercial use of carbon monoxide is the production of phosgene according to the following reaction:

$$CO(g) + Cl_2(g) = COCl_2(g)$$

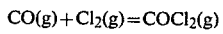

In the accompanying drawings, FIG. 1 shows theoretical effects of temperature and pressure on equilibrium yields of carbon dioxide produced in the foregoing reaction, as calculated by standard thermodynamic methods assuming ideal behavior and ignoring side reactions. It may be noted that essentially complete conversion of carbon dioxide to carbon monoxide theoretically occurs at temperatures greater than 1000° C., if the total system pressure is one atmosphere, and that a temperature of 1600° C. is high enough to produce almost pure carbon monoxide at system pressures as great as one hundred atmospheres.

Although plasma arc methods have been utilized for many years to effect various chemical reactions at high temperatures, systematic production of carbon monoxide of high purity in a plasma arc reactor, as contemplated by this invention, has not been achieved heretofore.

SUMMARY OF THE INVENTION

According to this invention, carbon monoxide may be produced by delivering carbon dioxide to an arc so as to form a plasma, delivering solid carbon to the plasma, and quenching the resultant products. Unreacted carbon may be filtered from the quenched products to yield carbon monoxide.

Advantageously, one electrode may be made of solid carbon, which is consumed into the plasma, and which thus delivers some amounts of solid carbon into the plasma. Additional amounts of solid carbon may be added to the plasma. For example, carbon in powdered form, such as commercial lampblack, may be carried into the plasma by a stream of carbon dioxide. As will be explained in more detail below it may be more advantageous to introduce such additional solid carbon ahead of the arc.

High yields of carbon monoxide of high purity and high efficiencies of electrical-to-chemical conversion have been achieved by the method of the present invention. Other objects, features, and advantages of this invention will be evident from the following description of a system and its operation to practice this invention, with the aid of the accompanying drawings.

BRIEF DESCRIPTION OF THE DRAWINGS

FIG. 1 also shows one datum confirming an excellent agreement between the theoretical curve and the (mean) average of six experimental measurements made at 800° C. at a total system pressure of one atmosphere.

FIG. 3 is a view showing most parts in half-section of a feeder of the system of FIG. 2.

FIG. 4 is a view showing most portions in half-section of a reactor of the system of FIG. 2. The section of FIG. 4 is taken from the back of the reactor as shown in FIG. 2.

DETAILED DESCRIPTION OF THE PREFERRED MODE

Figure 2:
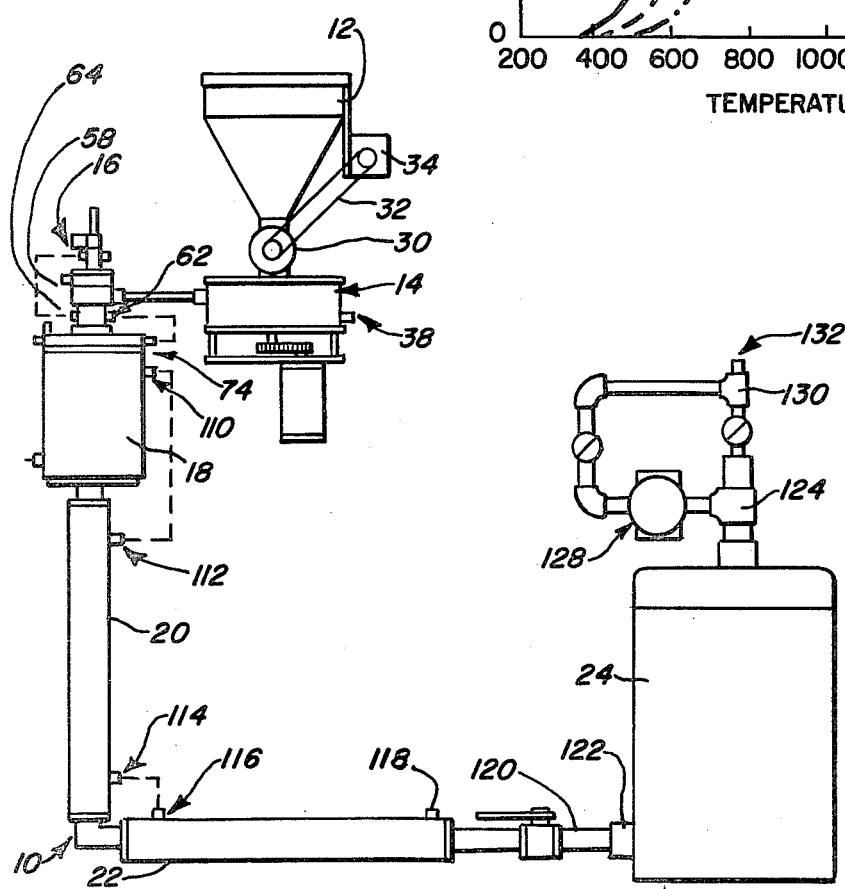
FIG. 2 is a semi-diagramatical layout of various components of a system that has been used to practice this invention.

As shown in a semi-diagramatic layout in FIG. 2, a system 10 to produce carbon monoxide from solid carbon and carbon dioxide generally comprises a reservoir 12, which supplies powdered carbon to a feeder 14, in which the carbon is agitated and mixed into a stream of carbon dioxide. The stream of carbon dioxide carries the carbon into a reactor 16, in which a plasma formed from carbon dioxide is sustained, so as to effect a reaction between the carbon and carbon dioxide, which is disassociated by the plasma into carbon monoxide and free oxygen. The resultant products, primarily carbon monoxide, secondarily carbon dioxide, and possibly some carbon, are quenched rapidly in an expansion chamber 18, a first heat exchanger 20, and a second heat exchanger 22, which are interconnected serially to the reactor 16. Any carbon is filtered from the quenched products by a filter 24 connected to the second heat exchanger 22.

As shown in FIG. 3, the feeder 14 is similar to one known for experimental studies of plasma reactions with powdered coal [McDonald and Hill, "Plasma Reactions with Powdered Coal", Fuels Engineering Department, University of Utah, Salt Lake City (1966) at 13-26]. A rotary valve 30 is driven via a belt 32 by a motor 34, which is mounted to the reservoir 12, and delivers powdered carbon from the reservoir 12 to a chamber 36, into which carbon dioxide is introduced through an inlet 38 connected to a manifold 40 within the chamber 36. The carbon may be commercial lampblack, such as Germantown Bear Brand or B-5 Lampblack made by Monsanto Chemical Co., or equivalent material. An impeller 42, which is driven via an enclosed gear train 44 by a motor 46, agitates the carbon and carbon dioxide and may be said to fluidize the carbon, which is carried in a stream of carbon dioxide from the chamber 36 through an outlet 48.

As shown in FIG. 4, the reactor 16 is oriented vertically and comprises a cathode portion 50 and an anode portion 52, which are separated by an insulator 54. Conventional bolts 56 are used to mount the cathode portion 50 to the anode portion 52 with the insulator 54 therebetween. The cathode portion 50 is water-cooled and comprises an inlet 58, an outlet 60, and internal passages (not shown) for coolant water. The anode portion 52 is water-cooled and comprises an inlet 62, an outlet 64, and an internal annulus 66 for coolant water.

As also shown in FIG. 4, the reactor 16 has a flange 68, which overlies an annular plate 70 having an inlet 72, an outlet 74, and an internal annulus 76 for coolant water. Conventional bolts 78 are used to mount the flange 68 to the plate 70. Conventional bolts 80 are used to mount the plate 70 to an upper end of the expansion chamber 18. As suggested in dashed lines in FIG. 2, the outlet 74 of the plate 70 may be connected to the inlet 62 of the anode portion 52, the outlet 64 of which may be connected to the inlet 58 of the cathode portion, so that coolant water from a suitable source (not shown) flows successively between the plate 70 and the flange 68, through the anode portion 52, through the cathode portion 50, to a suitable receiver (not shown).

The cathode portion 50 supports an elongated electrode 84. Because tungsten electrodes deteriorate rapidly in an atmosphere of carbon dioxide, the electrode 84 preferably is made of solid carbon, whose consumption is advantageous as explained hereinbelow. A conventional drive system (not shown) automatically advances the carbon electrode 84 at a controlled rate relative to its consumption of "burn-off". The cathode portion 50 has an upper inlet 86, which admits carbon dioxide to an annulus 88 encircling the electrode 84, and a lower inlet 90, which admits the stream of carbon dioxide carrying powdered carbon to the annulus 88. Carbon dioxide flowing through the annulus 88 and along the electrode 84 inhibits short circuiting through a layer of deposited carbon that may form between the cathode portion 50 and the anode portion 52.

Electrical power is applied across a female connector 92 on the cathode portion 50 and a male connector 94 on the anode portion 52. A discharge of high voltage at high frequency, 3,000 volts at four megahertz for 0.5 second as an example, is used to initiate an arc and produce a plasma from carbon dioxide introduced through the upper inlet 86. The plasma is sustained by a conventional power supply, Model C-2500-MD-2A formerly manufactured by Chemetron Corporation and rated at 50 kw as an example (not shown).

Although the consumption of the electrode 84 delivers some carbon to the plasma, for high yields of carbon monoxide require high inputs of carbon dioxide and additional amounts of solid carbon, which advantageously may be introduced in a stream of carbon dioxide. It has been found experimentally and surprisingly that significantly higher yields of carbon monoxide can be achieved if the stream of carbon dioxide carrying powdered carbon is injected ahead of the arc, above the tip 96 of the electrode 84 shown in FIG. 4, rather than directly into the arc.

The primary expansion chamber 18, which is covered by the water-cooled plate 70 as mentioned before, comprises an inner cylindrical wall 102 and an outer cylindrical wall 104, which define an annulus 106 therebetween for coolant water from a suitable source (not shown), into an inlet 108 communicating with the annulus 106, through the annulus 106, and from an outlet 110 communicating with the annulus 106. As suggested in phantom lines in FIG. 2, the outlet 110 of the primary expansion chamber 18 may be connected to an inlet 112 of the first heat exchanger 20, and an outlet 114 of the first heat exchanger 20 may be connected to an inlet 116 of the second heat exchanger 22, which has an outlet 118 connected to a suitable receiver (not shown).

Each such heat exchanger may comprise four standard-walled copper tubes (1 in. o.d.) soldered in a symmetrical square array inside a length (3 ft.) of copper tube (3.125 in o.d.). These details are conventional and not shown. Thus, the products received from the primary expansion chamber 18 are conducted through the smaller copper tubes and coolant water is passed through the larger copper tube, which serves as a shell. Other arrangements of a single tube or multiple tubes sufficient to cool the products may be used alternatively.

Figure 1:
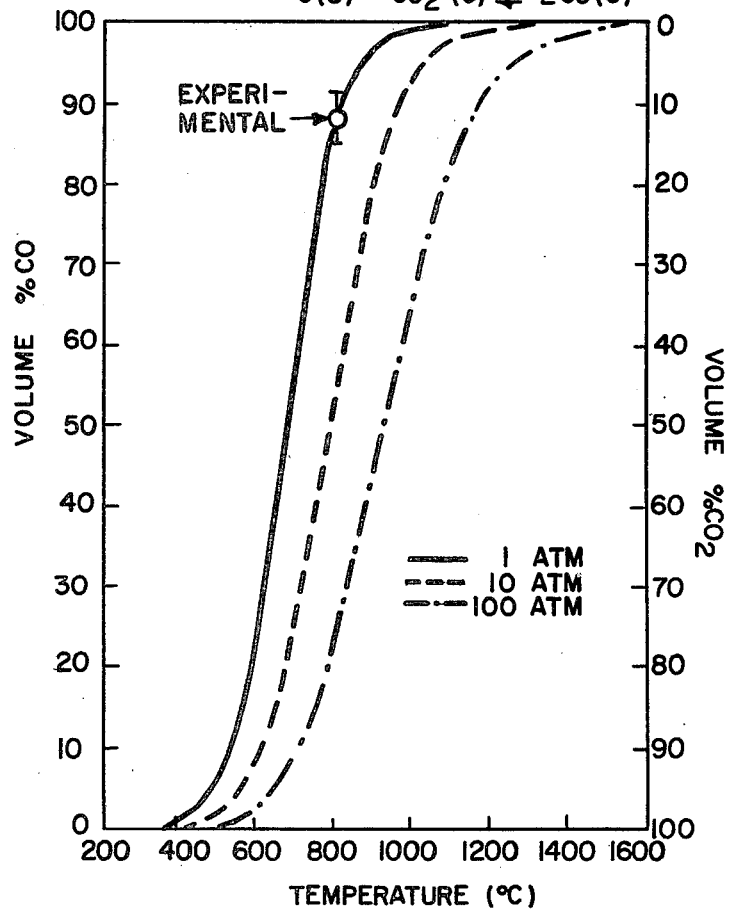
FIG. 1, which is discussed hereinabove, is a graph showing theoretical yields of carbon monoxide versus various temperatures at respective pressures of one, ten, and one hundred atmospheres.

Rapid quenching of the gaseous products is essential to produce high yields of carbon monoxide, which is thermodynamically unstable but kinetically stable with respect to carbon and carbon dioxide at low temperatures. A gradual decrease in the temperature of carbon monoxide, especially in the presence of carbon, would tend to permit the formation of the equilibrium ratios of carbon monoxide/carbon dioxide as predicted in FIG. 1. The final ratio would depend mostly upon the temperature range in which the approach to equilibrium is inhibited for kinetic reasons.

The filter 24 is a commercial Torit dust collector (30 in. long, 24 in. wide, 30 in. high), from which the internal gas circulation fan has been removed. A pipe 120 carries the cooled products into the inlet 122 of the filter 24. A tee 124 provided at the outlet of the filter 24 allows the filtered products to be conducted either through a conventional Roots meter 128, which measures the rate of gas flow, or directly to another tee 130, which delivers carbon monoxide of high purity at an outlet 132.

A summary of experimental data, which were collected during some of the experimental runs carried out during this study, has been listed in the following table. It is to be noted that a carbon monoxide concentration as high as 99% by volume was achieved during one of the experimental runs. The carbon/carbon dioxide ratio delivered into the plasma arc reactor during this run was approximately 0.55 g/l. This was very close to the carbon/carbon dioxide ratio of 0.54 g/l which is required to produce carbon monoxide in 100% yields. The carbon dioxide flow rate during this run was only about 62 l/min. At higher carbon dioxide flow rates the carbon/carbon dioxide ratio dropped to approximately 0.45 g/l. This acounts for the drop in carbon monoxide yield from approximately 99% to 92%.

Electrical to chemical conversion efficiencies were also calculated from the experimental data. These efficiencies are also included in the following table. The conversion efficiencies were calculated from the ratio of the energy required to produce carbon monoxide and the total electrical energy actually consumed. The energy of formation of 20,610 cal/mole for carbon monoxide, as produced according to the equation $C(s) + CO_2(g) = 2CO(g)$, was used in these calculations. It may be seen that electrical to chemical conversion efficiencies of approximately 37% were achieved in two of the experimental runs indicated in the following table. It is possible that even higher electrical to chemical conversion efficiencies could have been achieved in these runs if the carbon/carbon dioxide ratio has been higher than 0.45 g/l.

TABLE

OPERATING CONDITIONS AND RESULTS OBTAINED DURING PRODUCTION OF CARBON MONOXIDE IN PLASMA ARC REACTOR

| TOTAL $CO_2$ INPUT FLOW RATE AT STP (l/min) | $C/CO_2$ RATIO (g/l) | ELECTRICAL CHARACTERISTICS ||| TOTAL RUN TIME (min) | AVERAGE CO YIELD IN PRODUCT GASES (% by Vol.) | ELECTRICAL TO CHEMICAL CONVERSION EFFICIENCY (%) |
|---|---|---|---|---|---|---|---|
| | | CURRENT (amps) | VOLTAGE (volts) | POWER (kw) | | | |
| 88 | 0.45 | 130 | 200 | 26 | 10 | 92 | 37 |
| 88 | 0.45 | 130 | 200 | 26 | 11 | 90 | 36 |
| 88 | 0.45 | 135 | 200 | 27 | 10 | 93 | 36 |
| 88 | 0.45 | 130 | 200 | 26 | 16 | 92 | 37 |
| 62 | 0.55 | 140 | 200 | 28 | 21 | 99 | 28 |
| 73 | 0.40 | 135 | 200 | 27 | 12 | 83 | 25 |
| 60 | 0.40 | 135 | 200 | 27 | 32 | 85 | 21 |

While the presently preferred mode to carry out this invention has been described in some detail hereinabove, it is to be understood that various modifications may be made therein and are intended to be included within the scope of the appended claims.

What is claimed is:

1. A method of producing carbon monoxide comprising the steps of:
    delivering a first stream of carbon dioxide to an arc to form a plasma,
    delivering solid carbon to the plasma, at least a portion of said solid carbon delivered to the plasma from an electrode of solid carbon, and at least a portion of said solid carbon delivered to the plasma in powdered form, said solid carbon powder carried by a second stream of carbon dioxide and injected into the plasma ahead of the arc, and
    quenching the resultant products.

2. The method of claim 1 wherein the first stream of carbon dioxide is injected ahead of the second stream of carbon dioxide carrying said solid carbon powder.

3. The method of claim 1 wherein carbon dioxide is caused to flow along the electrode of solid carbon so as to inhibit short circuits from deposited carbon.

4. The method of claim 3 wherein the first stream of carbon dioxide is injected ahead of the second stream of carbon dioxide carrying said solid carbon powder.

5. The method of claim 1 further comprising the step of filtering the quenched products to remove carbon therefrom.

* * * * *